(No Model.)
F. H. HILL.
CULINARY UTENSIL.
No. 368,210. Patented Aug. 16, 1887.
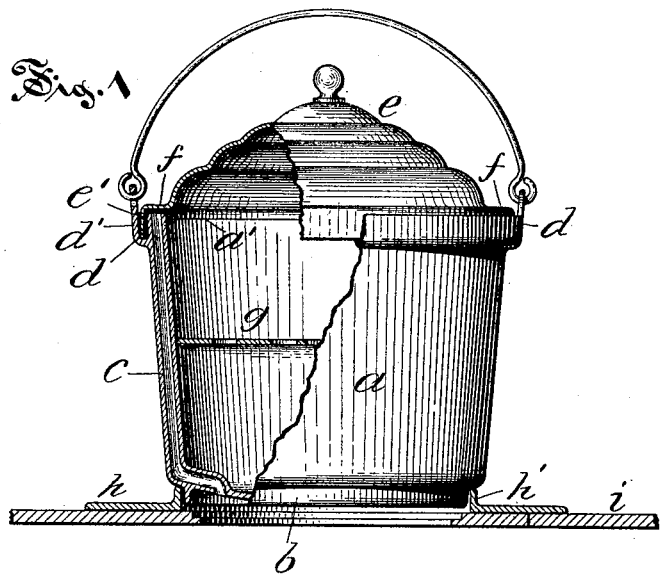
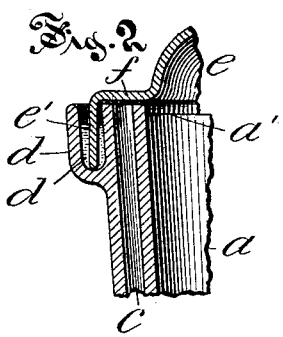
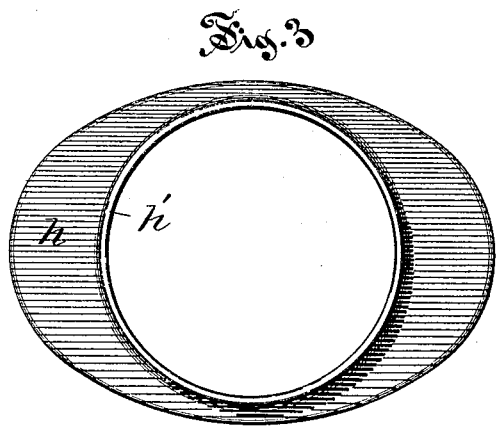
Witnesses:
W. M. Bjorkman,
H. C. Williams,
Inventor:
Fred H. Hill,
by Simonds & Burdett,
attys.

UNITED STATES PATENT OFFICE.

FRED. H. HILL, OF BOSTON, MASSACHUSETTS.

CULINARY UTENSIL.

SPECIFICATION forming part of Letters Patent No. 368,210, dated August 16, 1887.

Application filed March 10, 1887. Serial No. 230,335. (No model.)

*To all whom it may concern:*

Be it known that I, FRED. H. HILL, of Boston, in the county of Suffolk and State of Massachusetts, have invented certain new and useful Improvements in Culinary Utensils, of which the following is a full, clear, and exact description, whereby any one skilled in the art can make and use the same.

The object of my invention is to produce a kettle for steaming and also for boiling food that is provided with means whereby the steam and odor are prevented from escaping into the room, and also one the contents of which will not boil over upon the outside of the kettle; and to this end my invention consists in a kettle having a water seal about its upper edge and an odor-tube opening through the bottom of the kettle, in combination with a domed cover having a flange adapted to fit within the channel of the water seal, and a steaming-disk.

It further consists in a kettle having an odor-tube with its top above the level of the side walls of the water-seal channel, and further in a kettle having a substantially flat bottom in combination with a flanged oval ring; and it further consists in the combination of a kettle having an odor-tube with its top above the edge of the side walls of the channel of the water seal and a cover having a flat surface adapted to fit over and partly close the top of the odor-tube, and still further in details of the several parts and their combination, as more particularly hereinafter described, and pointed out in the claims.

Referring to the drawings, Figure 1 is a side view of the covered kettle with parts broken away to show construction. Fig. 2 is a detail view, on enlarged scale, of the upper edge of the kettle and edge of the cover, showing the relative location of the kettle and the top of the odor-tube. Fig. 3 is a plan view of the oval ring.

In the accompanying drawings, the letter $a$ denotes the kettle, which is preferably of iron cast to shape, with a substantially flat bottom, $b$, and having the odor-tube $c$ cast within the walls of the vessel. About the edge of the kettle, and completely surrounding it, is a flange, $d'$, between which and the upper edge, $a'$, of the kettle is formed the channel of the water seal $d$. The upper end or mouth of the odor-tube $c$ rises slightly above the edge of the kettle $a'$, and this prevents water and moisture from boiling over into the odor-tube from the channel $d$, in which water is poured to form a water seal for the joint between the kettle and its cover. The lower end or outlet of the odor-tube is arranged a slight distance within the edge of the bottom of the kettle, so as to deliver steam and odor downward into the fire-pot of the stove over which the kettle is being used.

The cover $c$ is rounded upward at its center, or dome-shaped, and has a flange, $e'$, that is bent sharply downward, and is adapted to fit within the channel of the water seal, so as to close and seal the kettle, and near the flanged edge the cover is provided with a flat surface, $f$, formed either by a bend in the substance of the cover or by fastening a flat ring within it, that when the flanged edge of the cover rests on the bottom of the water-seal channel it is close down upon and partly stops the mouth of the odor-tube. By means of this construction the outflow of odor and steam, particularly the latter, is controlled, so that the contents of the kettle that may rest upon the steaming-disk $g$ is subjected to the action of the steam under a certain degree of pressure, that more effectually steams the substance being cooked. When the pressure reaches a certain degree, the cover lifts and the escape of the steam through the odor-pipe relieves the pressure and also creates a strong draft down the tube, carrying the odor with it out of the kettle into the stove. The bottom, $b$, of the kettle is preferably flat and slightly rabbeted about the lower edge, so as to fit within the upturned flange $h'$ of the oval ring $h$, that is adapted to hold the kettle with its bottom $b$ away from the top $i$ of a stove, on which the ring $h$ rests. The ring not only adapts the kettle for use on cover-holes of varying sizes, but by reason of its flat shape it may be so placed on the stove that the flange will overlie the cracks formed between the several covers and the top of the stove, and this will enable the kettle to be slid along the top of the stove without lifting it off from the latter. The oval shape of the ring enables me to obtain this advantage with the least amount of metal.

I claim as my improvement—

1. In combination with a kettle, $a$, having the odor-tube $c$, and the channel $d$, adapted to hold water for the purpose of forming a water seal, and said channel having its inner wall, $a'$, below the level of the top of the odor-tube, the domed cover $e$, having a downturned flange, $e'$, fitting loosely within the channel of the water seal, all substantially as described.

2. The improved kettle, having the odor-tube with an outlet at the bottom of the kettle, and its top located above the level of the inner edge of the wall of the water-seal channel, and the water seal $d$, all substantially as described.

3. In combination with a kettle having the water-seal channel and the odor-tube $c$, the cover having a flat surface, $f$, that overlies and partly closes the mouth of the odor-tube $c$, said cover having also a flange that fits within the water-seal channel, all substantially as described.

FRED. H. HILL.

Witnesses:
S. K. HAMILTON,
ALBERT DAVITT.